United States Patent [19]

Tanaka et al.

[11] Patent Number: 5,719,214
[45] Date of Patent: Feb. 17, 1998

[54] POLYESTER-GRAFTED STARCH-POLYMER ALLOY

[75] Inventors: Hideyuki Tanaka; Tetsuya Kawamatsu; Isamu Utsue, all of Aichi; Yasuhito Okumura, Chiba; Hiroshi Tanaka, Aichi, all of Japan

[73] Assignee: Japan Corn Starch Co., Ltd., Aichi, Japan

[21] Appl. No.: 606,879

[22] Filed: Feb. 26, 1996

[30] Foreign Application Priority Data

Jul. 14, 1995 [JP] Japan .................... 7-179035

[51] Int. Cl.$^6$ .................................... C08L 3/00
[52] U.S. Cl. ............... 524/47; 524/51; 525/54.24; 525/54.31; 527/300; 527/304; 536/107; 536/110; 536/115; 536/119; 536/126
[58] Field of Search .............. 524/47, 51; 525/54.24, 525/54.31; 527/300, 304; 536/107, 110, 115, 119, 126

[56] References Cited

U.S. PATENT DOCUMENTS

| | | | |
|---|---|---|---|
| 3,795,670 | 3/1974 | Mark et al. | |
| 4,891,404 | 1/1990 | Natayan et al. | 525/54.2 |
| 5,367,067 | 11/1994 | Frische et al. | 536/45 |
| 5,462,983 | 10/1995 | Bloembergen et al. | 524/51 |
| 5,525,671 | 6/1996 | Ebato et al. | 525/53 |
| 5,578,691 | 11/1996 | Narayan et al. | 527/300 |

FOREIGN PATENT DOCUMENTS

WO 92/16583  10/1992  WIPO .
WO 93/20110  10/1993  WIPO .
WO 94/07953  4/1994  WIPO .

OTHER PUBLICATIONS

A. M. Mark and C. L. Mehltretter, Die Starke 22, Jahrg, 1970/Nr. (pp. 108–110). Publication discussing the acetylation of high-amylose corn starch.

A. M. Mark and C. L. Mehltretter, Die Starke 24, Jahrg, 1972/Nr. 3 (pp. 73–76). Publication discussing preparation of statch triacetates.

Journal of Applied Polymer Sciences, vol. 22, 1978 (pp. 459–465). "A New Biodegradable Plastic Made from Starch Graft Poly (methyl acrylate) Copolymer". Publication discussing grafted starch–based, biodegradable plastics.

*Primary Examiner*—Nathan M. Nutter
*Attorney, Agent, or Firm*—Quarles & Brady

[57] ABSTRACT

A polyester-grafted starch-polymer alloy is capable of imparting practical flexibility and toughness to moldings with no or only a little plasticizer. The polyester-grafted starch-polymer alloy comprises a blend of a polyester-grafted starch (a starch which has polyester graft chains on the starch molecule, with the terminal hydroxyl groups of the polyester graft chains and the hydroxyl groups connected directly to the starch entirely or partly blocked with the ester group) and an independent polyester (a polyester which is constructed of the same unit as said polyester graft chain, with its terminal hydroxyl groups entirely or partly blocked with the ester group) which are uniformly mixed together. A method of preparing the alloy and thermoplastic resin compositions containing the alloy also are disclosed.

4 Claims, No Drawings

POLYESTER-GRAFTED STARCH-POLYMER ALLOY

FIELD OF THE INVENTION

The present invention relates to a new polyester-grafted starch-polymer alloy, a process for synthesis thereof, and biodegradable thermoplastic resin compositions made entirely or partly from the polyester-grafted starch-polymer alloy.

BACKGROUND OF THE INVENTION

Because of environmental concerns there is much active development work going on in the research for practical biodegradable resins and resin compositions. Some of the materials being evaluated are listed below.
1) Polyester-based plastics, such as PCL, PLA, and PHB/V.
2) Cellulose derivatives.
3) A blend of PVA or ethylene-vinyl acetate copolymer with starch.
4) Highly esterified starch (especially, starch esterified with acetic acid to a high degree of substitution).

Of the above examples, the highly esterified starch derivatives are attracting attention because of their low production cost. There are some known references regarding such biodegradable resins, although they do not directly affect the novelty of the present invention. They include U.S. Pat. No. 5,367,067, PCT/US92/02003, and Japanese Patent Application Publicized No. 508185/1993. Also a process for the synthesis of starch esters is reported in "Die Starke" P-73, 1972, by A. M. Mark and C. L. Mehltretter. In addition, grafted starch-based biodegradable plastics are disclosed in Japanese Patent Laid-open No. 125101/1993 (filed by Asahi Chemical Industry Co., Ltd.) and "A New Biodegradable Plastic Made from Starch Graft Poly(methyl acrylate) Copolymer" (Journal of Applied Polymer Science, vol. 22, 459–465, 1978).

The known technology for the synthesis of esterified starch and grafted starch has not yet reached the level of practical use. As far as the present inventors know, none of the prior art biodegradable plastics based on starch derivatives have been put to practical use and put on the market. A probable reason for this is that products (molded items, film, sheet, etc.) produced from highly esterified starch alone or polyester-grafted starch alone have the physical and chemical disadvantages shown below:

(1) Physical disadvantages:

a) Moldings are brittle and lack toughness for practical use. For moldings to have sufficient toughness and flexibility, it is necessary to incorporate a large amount of plasticizer. This poses a problem associated with a decrease in mechanical strength and deterioration with time.

b) Moldings are so susceptible to moisture and water that they cannot be used in application areas where water resistance, moisture resistance, water repellence, and water vapor permeability are required.

(2) Chemical disadvantages:

a) The reaction temperature for the polyester grafting is so high that the starch undergoes thermal degradation.

b) The reaction product is so hydrophilic that it cannot be practically recovered under water.

c) The reaction is such that the polyester graft side chains have a low degree of polymerization.

The blending of a modified starch with a synthetic thermoplastic resin has been attempted. However, the resulting blend is poor in mechanical properties and the transparency is poor if the modified starch is conventional one which is formed by graft polymerization alone or esterification (at a high degree of substitution with a low molecular weight) by an acid anhydride or acid halide.

The above described results are due to poor compatibility of the modified starch with the resin. It is believed that resin compatibility depends on the distribution of substituent groups on the starch molecule, the degree of modification of starch, and the molecular weight of starch. It would be advantageous to have biodegradable resins which do not have the above disadvantages and which are inexpensive and biodegradable.

SUMMARY OF THE INVENTION

It is an object of the present invention to provide polyester-grafted starch-polymer alloys, a process for synthesis thereof, and biodegradable thermoplastic resin compositions containing the alloys which can be used to make products that possess practical flexibility and toughness and which require no or only a little plasticizer.

We have discovered that the above objects can be achieved with novel polyester-grafted starch-polymer alloys, a process for synthesis thereof, and biodegradable thermoplastic resin compositions derived therefrom.

The polyester-grafted starch-polymer alloys of the present invention are uniform mixtures (at the molecular level) of a polyester-grafted starch derivative and an independent polyester. The polyester-grafted starch derivative is one in which the starch molecule has polyester graft side chains, with terminals entirely or partly ester-blocked and ungrafted hydroxyl groups on the starch molecule which are entirely or partly blocked with ester groups. In the preferred alloys the independent polyester is composed of the same units as the polyester graft side chains of the polyester-grafted starch derivative.

The polyester-grafted starch-polymer alloys of the present invention are prepared by a process which comprises dissolving starch and an esterifying/grafting catalyst in a non-aqueous organic solvent, preferably with heating; reacting the starch with a lactone (including dimer and trimer) as a grafting agent; adding a catalyst for the ring-opening polymerization of lactone at an intermediate stage of reaction; simultaneously grafting the polymer of lactone to the starch and forming the independent polyester, and subsequently adding an esterifying agent to simultaneously esterify and block all or part of the terminal hydroxyl groups of the polyester graft chain, the terminal hydroxyl groups of the molecular miscible polymer, and the hydroxyl groups connected directly to the starch.

The biodegradable thermoplastic resin compositions of the present invention are those which are comprised entirely or partly of a polyester-grafted starch-polymer alloy of the present invention.

DESCRIPTION OF PREFERRED EMBODIMENTS

The terms and abbreviations used herein are defined as follows.

(1) Alloy: A uniform blend of different polymers. In the present invention, this term is used to denote a mixture in the molecular state of an esterified, polyester-grafted starch and a polyester which are formed simultaneously or sequentially in the same reaction system.

(2) Ester blocking ratio: The ratio of the terminal hydroxyl groups of grafted polyester and independent polyester and the hydroxyl groups connected directly to starch which are blocked by esterification. The ester blocking ratio will be 100% if all the hydroxyl groups are blocked.

(3) DS value: The degree of esterification and etherification of the derivative, or the average number of substituted hydroxyl groups per glucose residue. The DS value will be 3 if all the hydroxyl groups are blocked.

(4) Degree of substitution by grafting (MS): This is defined by the formula below.

$$MS=(A/B)/(C/D)$$

where A is the weight of lactone for grafting,
B is the molecular weight of lactone,
C is the weight of starch charged, and
D is the molecular weight of starch.

(5) PCL: polycaprolactone PLA: polylactic acid PHB/V: polyhydroxybutyrate/valeate (6) phr: The amount (parts by weight) of adjuvant added to 100 parts by weight of base polymer.

(7) "%" means "wt %" or "% by weight" unless otherwise indicated.

In a preferred embodiment of the invention the polyester-grafted starch-polymer alloy is basically a uniform mixture of a starch derivative and a polymer. The starch derivative is a polyester-grafted starch derivative which is formed by esterifying starch and grafting starch with a polyester. The polymer is an independent polyester composed of the same unit as said polyester graft side chains.

The polyester-grafted starch derivative is prepared by esterifying starch with one or more saturated or unsaturated aliphatic acids or aromatic carboxylic acids having 2 to 18 carbon atoms and grafting to the esterified starch a polyester which is a polymer formed by ring-opening polymerization of one or more 4- to 12-membered lactones. The esterifying is accomplished so as to block entirely or partly the hydroxyl groups connected directly to starch, the terminal hydroxyl groups on the polyester side chains, and the terminal hydroxyl groups of the independent polymer.

The polyester-grafted starch-polymer alloys of the present invention may be represented by the formula shown below.

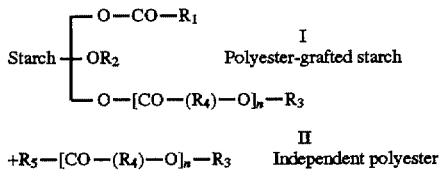

$$\text{Starch} \begin{bmatrix} O-CO-R_1 \\ OR_2 \\ O-[CO-(R_4)-O]_n-R_3 \end{bmatrix} \quad \text{I Polyester-grafted starch}$$

$$+R_5-[CO-(R_4)-O]_n-R_3 \quad \text{II Independent polyester}$$

where, Starch is the residue of starch molecule (including low modified starch derivatives);

$R_1$ is an alkyl group, an alkenyl group, and aryl group having 1 to 17 carbon atoms (preferably 1 to 7 carbon atoms);

$R_2$ is hydrogen or an acyl group having 2 to 18 carbon atoms, $R_3$ is hydrogen or an acyl group having 2 to 18 carbon atoms, $R_4$ is one or more saturated hydrocarbon groups represented by $C_mH_{2m}$ (m=1 to 11); and $R_5$ is an alkoxyl group having less than 10 carbon atoms or a polyalkoxyl group having less than 200 carbon atoms or a hydroxyl group and n is less than 4000.

The alkyl groups ($R_1$) and the alkyl group in the acyl groups $R_2$ and $R_3$ may be exemplified by methyl, ethyl, propyl, butyl, octyl, dodecyl, and stearyl. The alkenyl groups may be exemplified by acryl, hexenyl, and octenyl. The aryl groups may be exemplified by benzyl, p-toluyl, and xylyl. Preferred alkyl groups include methyl, ethyl, and propyl.

The polyester-grafted starch should have an ester blocking ratio of about 15 to about 100% (preferably about 20 to about 100%) and a degree of substitution for grafting with polyester (polylactone) of about 0.1 to about 20 (preferably about 0.2 to about 10).

Both the polyester graft side chain and the independent polyester should have molecular weights of about 500 to about 200000 (preferably 1000 to 150,000). If the molecular weight of the polyester side chain and independent polyester is lower than 500, the resulting resin composition lacks uniformity at the molecular level and has little improvement in physical properties. A molecular weight in excess of 200000 is not desirable from the standpoint of reaction time.

If the ester blocking ratio is lower than 15%, the resulting resin composition is not improved in moisture absorption, water susceptibility, and moldability. The ester blocking ratio should be as close to 100% as possible so that the resin composition yields which are superior in water resistance and other water-related properties.

If the degree of substitution for graft molecules (MS) is lower than 0.1, the resulting resin composition is plasticizable but does not yields products, such as moldings having improved physical properties (while retaining biodegradability). A value of MS in excess of 20 is not practicable from the standpoint of production cost and reaction time.

The alloy should contain in addition to the polyester-grafted starch the independent polyester (polylactone) in an amount less than about 70% (preferably less than about 50%) by weight of the alloy.

The amount of the independent polyester in the alloy can range from about 5 to about 70%. It depends on the molecular weight and property regarding the independent polyester and modified starch and the cost-performance balance. With an amount less than 5%, the resulting resin composition can be brittle. With an amount in excess of 70%, the resulting resin composition can be poor in stiffness and disadvantageous costwise.

The polyester-grafted starch-polymer alloy of the present invention may be prepared by any process which is not specifically restricted. One way is by preparing the two components separately and melt-mixing them by heating or by mixing them in the form of solvent solution. However, the following process is preferable.

According to the present invention, the preferred process comprises reacting starch with a vinyl ester, acid anhydride, or acid halide (as an esterifying agent), a lactone (as a grafting agent and also as an agent for the independent polymer) in a nonaqueous organic solvent with the aid of an esterifying/grafting catalyst and a polymerization catalyst (for the independent polymer), thereby performing three reactions, (that is, esterifying, grafting, and polymerization of the independent polymer) simultaneously or sequentially.

The starch for use in the preferred process includes the following:

(a) Corn starch, high-amylose corn starch, wheat starch, and other unmodified starches originating from terrestrial stems.

(b) Potato starch, tapioca starch, and other unmodified starches originating from subterranean stems.

(c) Slightly modified starches prepared from the above-mentioned starches by esterification, etherification, oxidation, acid treatment, and dextrinizing.

These starches may be used alone or in combination with one another.

In the case where the esterifying, grafting, and polymerization are carried out sequentially, their order is immaterial. Examples of the order are:

grafting→polymerization→esterifying; or esterifying→grafting→polymerization→esterification again. It is also possible to use a commercial esterified starch or polyester (polylactone) grafted starch as the starting material. In this case, a vinyl ester, acid anhydride, or acid halide, lactone may be used for grafting, esterifying, or polymerization for the independent polymer.

The vinyl ester used for esterifying is one in which the ester group has 2 to 18 carbon atoms (preferably 2 to 7 carbon atoms). One or more vinyl esters may be used alone or in combination with one another. Any vinyl ester in which the ester group has more than 18 carbon atoms is high in yields of reagent utilization but poor in reaction efficiency. Any vinyl ester in which the ester group has 2 to 7 carbon atoms is desirable because of its high reaction efficiency (70% or above).

Typical examples of the vinyl esters are given below. Of these examples, vinyl acetate and vinyl propionate are desirable because of their high reaction efficiency. (The parenthesized number indicates the number of carbon atoms in the ester group.):

(a) Vinyl esters of saturated aliphatic acids, such as vinyl acetate (C2), vinyl propionate (C3), vinyl butanoate (C4), vinyl caproate (C6), vinyl caprylate (C8), vinyl laurate (C12), vinyl palmitate (C16), and vinyl stearate (C18).

(b) Vinyl esters of unsaturated aliphatic acids, such as vinyl acrylate (C3), vinyl crotonate (C4), vinyl isocrotonate (C4), and vinyl oleate (C18).

(c) Vinyl esters of aromatic carboxylic acids, such as vinyl benzoate and vinyl p-methylbenzoate.

The acid anhydrides and acid halides that can be used for esterification are those derived from organic acids having 2 to 18 carbon atoms, preferably 2 to 8 carbon atoms. Preferred examples include the anhydrides and the halides of acetic acid, propionic acid, and butyric acid.

In one embodiment of the present invention, a vinyl ester may be used as the nonaqueous organic solvent. This embodiment obviates the necessity of solvent recovery in the purification step. Incidentally, this mode of reaction is not employed in the conventional esterification with a vinyl ester. This embodiment offers the advantage that the resulting product does not decrease in molecular weight and the reaction efficiency of vinyl ester is high. On the other hand, this embodiment has the disadvantage that the vinyl ester has to be used in the form of liquid (or heated melt) and the reaction is slightly uneven. The vinyl esters that can be used in this embodiment include those exemplified above.

In another embodiment of the present invention, the nonaqueous organic solvent is not a vinyl ester. In other words, the vinyl ester used as the reaction agent is not used as the nonaqueous organic solvent. The advantage of not using a vinyl ester as the nonaqueous organic solvent is that it is possible to readily control the reactant concentration and reaction rate regardless of the kind of the vinyl ester. Another advantage is that the reaction is more uniform than in the case where a vinyl ester is used as the nonaqueous organic solvent. However, there is a disadvantage in that the solvent has to be recovered after separation from the esterifying agent.

The nonaqueous organic solvents for use in the process of the present invention include the following:

(a) Polar solvents, such as dimethyl sulfoxide (DMSO), dimethylformamide (DMF), and pyridine, which dissolve starch.

(b) Polar solvents, such as ethyl acetate and acetone, which do not dissolve starch but dissolve the vinyl ester, acid anhydride, acid halide, and esterified starch (without reaction with vinyl ester, acid anhydride, and acid halide).

The solvents may be used alone or in combination with one another. Of these examples, DMSO, DMF, and pyridine are desirable from the standpoint of the efficiency and uniformity of their reaction.

The esterifying catalyst may be selected from any of the following three groups:

(1) Hydroxides and/or mineral acid salts, organic acid salts, carbonates, or alkoxides of metals belonging to alkali metals, alkaline earth metals, and amphoteric metals.
(2) Organic phase transfer catalysts.
(3) Amino compounds.

Of these groups, the first one (1) is preferred from the standpoint of reaction efficiency and catalyst cost. Examples of each group are given below.

(1) Alkali metal hydroxides, such as sodium hydroxide, potassium hydroxide, and lithium hydroxide; alkali metal salts of organic acids, such as sodium acetate, sodium propionate, and sodium p-toluenesulfonate; hydroxides of alkaline earth metals, such as barium hydroxide and calcium hydroxide; alkaline earth metal salts of organic acids, such as calcium acetate, calcium propionate, and barium p-toluenesulfonate; salts of mineral acids, such as sodium phosphate, calcium phosphate, sodium bisulfite, and potassium sulfate; salts of acids of amphoteric metals or hydroxides of amphoteric metals, such as sodium aluminate, potassium zincate, aluminum hydroxide, and zinc hydroxide; carbonates such as sodium carbonate, sodium bicarbonate, and potassium bicarbonate; sodium alcoholates, such as sodium methylate and sodium ethylate; trialkoxyaluminum compounds, such as aluminum isopropylate and aluminum ethylate; and alkoxy aluminum chelate compounds, such as aluminum ethyl acetate diisopropylate.

(2) Amino compounds, such as dimethylaminopyridine and diethylaminoacetic acid.

(3) Quaternary ammonium compounds, such as N-trimethyl-N-propyl ammonium chloride and N-tetraethylammonium chloride.

Preferably the above-mentioned catalyst should be previously impregnated into the starch so as to improve the reaction efficiency in the case where the reaction is carried out in a vinyl ester as the medium or the reaction is carried out in a nonaqueous solvent which does not dissolve starch.

Several methods for impregnation are the following:

(1) A method consisting of dipping raw starch in an aqueous solution or solvent containing the catalyst.
(2) A method consisting of mixing raw starch with an aqueous solution or solvent containing the catalyst using a mixing apparatus such as kneader.
(3) A method consisting of pregelatinizing raw starch using a drum dryer or the like together with an aqueous solution or solvent containing the catalyst.
(4) A method consisting of gelatinizing raw starch using a batch cooker or continuous cooker together with an aqueous solution or solvent containing the catalyst.

The esterification may be carried out at any temperature which is not specifically restricted. The reaction temperature is usually about 30° to about 200° C., preferably about 60° to about 150° C. for better reaction efficiency.

The conventional process that employs an acid anhydride or acid halide is carried out at 40° C. or below so that starch will not decrease in molecular weight (due to hydrolysis). By contrast, the process of the present invention that employs a vinyl ester can be carried out at higher temperatures because it gives no acid as the by-product. This leads to higher efficiency.

When vinyl ester is used as the esterifying agent, it should be used in an amount of about 1 to about 20 moles, preferably about 1 to about 7 moles, per mole of raw starch.

The amount of the esterifying catalyst to be used should usually be about 1 to about 30% of the anhydrous starch.

The grafting step of the process of the present invention employs one or more lactones (including dimer and trimer cyclic esters) as the grafting agent. They are selected from 4- to 12-membered lactones, whose examples include β-propiolactone (4), γ- and δ-valerolactones (5, 6), δ- and ε-caprolactones (6, 7), disalicylide (8), trisalicylide (12), 1,4-dioxane-2-one, glycolide, lactide, trimethylene carbonate, and ethylene oxalate. (Parenthesized numbers indicate the number of members.) Of these examples, 4- to 7-membered lactones, especially ε-caprolactone and lactide are desirable.

The grafting may be accomplished before or after the esterifying. Alternatively, grafting may be performed on a commercial esterified starch having an adequate degree of substitution.

The grafting may be carried by any polymerization method, for example, anionic polymerization, cationic polymerization, and coordination polymerization. The first method is desirable because it permits the grafting catalyst to be used in combination with the esterifying catalyst.

The polymerization should preferably be carried out in a nonaqueous organic solvent (polar solvent) that is used for esterifying. Polymerization should be carried out under the conditions which are similar to those under which grafting is performed on starch by ring-opening polymerization.

In the case of anionic polymerization, the grafting catalyst is the same as that used for esterifying mentioned above. In the case of cationic polymerization, it is possible to use an oxonium salt, a protonic acid, or a Lewis acid (with or without cocatalyst). The amount of the grafting catalyst should be about 0.0005 to about 50 parts for 100 parts of monomer.

Coordination polymerization may employ a reaction product of an organoaluminum or organozinc compound and water or acetylacetone or both (0.5–1.0 mole).

The grafting reaction temperature should usually be lower than 200° C. (preferably lower than 150° C.). Reaction at about 150° C. or below under reduced pressure is desirable so as to increase the degree of polymerization, to prevent starch from decreasing in molecular weight, and to shorten the reaction time. In order to ensure the grafting onto starch, it is desirable to previously treat starch with the catalyst under an alkaline condition, thereby forming a starch-metal complex, prior to the grafting reaction.

The polymerization reaction for the formulation of the independent polymer proceeds very slowly under the conditions for the grafting reaction under normal pressure. Therefore, some measure is necessary in order to accomplish the grafting reaction and the polymerization reaction for the independent polymer simultaneously or sequentially and to attain a prescribed molecular weight within a prescribed period of time. It has been found that the object is achieved by adding a catalyst with a time lag, said catalyst being a metal alkoxide, a hydroxide of an amphoteric metal, or a salt of an amphoteric metal acid, which is particularly effective for the polymerization reaction for the independent polymer which is different from the grafting reaction. It has also been found unexpectedly that the catalyst addition in this way makes it possible to control the content and molecular weight of the independent polymer in the resin composition. This contributes to uniform mixing at molecular level and improvement in physical properties of the resin composition.

The reaction temperature is the same as that for the grafting reaction. This permits a very efficient reaction control.

The biodegradable thermoplastic resin compositions of the present invention are comprised of a base polymer and an adjuvant, said base polymer being comprised entirely or partly of the polyester-grafted starch-polymer alloy mentioned above and the adjuvant being a biodegradable plasticizer, and/or filler, and/or dispersing type agent.

The amount of the polyester-grafted starch-polymer alloy in the base polymer should be about 5 to about 100 wt %, preferably about 25 to about 100 wt %. The amount of the plasticizer is usually 0–60 phr, preferably less than 30 phr. The amount of the filler is usually 0–200 phr, preferably 0–150 phr. The amount of the dispersing type agent is usually 0.005–100 phr, preferably 0.01–50 phr.

The base polymer can contain in addition to the polyester-grafted starch-polymer alloy one or more additional polymers selected from the group consisting of esterified and/or etherified starch derivatives, biodegradable polyesters, cellulose derivatives, polyvinyl alcohols, and polyvinyl esters, which are all highly biodegradable.

Other examples of such polymers include condensation polymers, such as polyamides, polycarbonates, polyurethanes etc., polyvinyl esters, vinyl polymers (excluding polyvinyl ester), polyolefins, polyalkylene oxides, biodegradable polyalkylene oxides, ethylene-vinyl acetate copolymers, ethylene-ethyl acrylate copolymers, ethylene-methyl acrylate copolymers, ABS resins, and styrene-acrylonitrile copolymers.

Specific examples of these polymers are given below:
(a) Biodegradable polyesters, including polycaprolactones, polylactic acid, polyadipates, polyhydroxybutyrate, polyhydroxybutyrate-valeate, etc.
(b) Cellulose derivatives, including cellulose acetate, hydroxyalkylcellulose, carboxyalkylcellulose, etc.
(c) Polyvinyl esters, including polyvinyl acetate, polyacrylonitrile, polyvinyl carbazole, polyacrylate ester, polymethacrylate ester, etc.
(d) Polyolefins, including polyethylene, polyisobutylene, polypropylene, etc.
(e) Vinyl polymers (excluding polyvinyl ester), but including vinyl chloride, polystyrene, etc.
(f) Polyalkylene oxides, including polyethylene oxide, polypropylene oxide, etc.

The biodegradable plasticizer may be one or more members selected from phthalate esters, aromatic carboxylate esters, aliphatic dibasic acid esters, aliphatic ester derivatives, phosphate esters, polyester plasticizers, epoxy plasticizers, and polymeric plasticizers.

Specific examples of these plasticizers are given below:
(a) Phthalate esters, including dimethyl phthalate, diethyl phthalate, dibutyl phthalate, dioctyl phthalate, ethylphthalyl ethyl glycolate, etc.
(b) Aliphatic dibasic acid esters, including butyl oleate, glycerin monooleate ester, butyl adipate, n-hexyl adipate, etc.
(c) Aromatic carboxylate esters, including trioctyl trimellitate, diethylene glycol benzoate, octyl oxybenzoate, etc.
(d) Aliphatic ester derivatives, including sucrose octacetate, diethylene glycol dibenzoate oxyacid ester, methyl acetylrecinolate, triethyl acetylcitrate, triacetin, tripropionin, diacetylglycerin, glycerin monostearate, etc.
(e) Phosphate esters, including tributyl phosphate, triphenyl phosphate, etc.
(f) Epoxy plasticizers, including epoxidized soybean oil, epoxidized castor oil, alkylepoxy stearate, etc.
(g) Polymeric plasticizers, including liquid rubbers, terpenes, linear polyester, etc.

The filler may be one or more members selected from synthetic and natural inorganic and organic fillers.

Specific examples of the filler are given below:

(a) Inorganic fillers, including talc, titanium oxide, clay, chalk, limestone, calcium carbonate, mica, glass, diatomaceous earth, wollastonite, silicates, magnesium salt, manganese salt, glass fiber, ceramic powder, etc.

(b) Organic fillers, including powdered cellulosic fiber (and derivatives thereof), wood powder, pulp, pecan fiber, cotton powder, hulls, cotton linter, wood fiber, bagasse, etc.

The dispersing agent for use in the process of the present invention is any agent (including thickeners and suspension agents together with normal dispersing agents) that promote and maintain the dispersion of a dispersoid. The dispersing agent may be one or more members selected from salts of fatty acids (having 4–18 carbon atoms), anionic surface active agents, nonionic surface active agents, cationic or anionic water-soluble synthetic polymers, condensed phosphates, cationic starch derivatives, cellulose derivatives, plant gums and derivatives thereof, animal polymers, microbial polymers, and synthetic polymer emulsions in the form of aqueous emulsion.

Specific examples of the dispersing agents are given below:

(a) Salts of fatty acids having 4–18 carbon atoms, such as sodium butanoate, potassium octanoate, sodium stearate, etc.

(b) Nonionic surface active agents, such as alkyl polyalkylene oxide, sucrose fatty acid ester, sorbitan fatty acid ester, dimethylpolysiloxane, etc.

(c) Anionic surface active agents, such as sodium alkylsulfate, sodium alkyl sulfonate, etc.

(d) Water-soluble synthetic polymers, such as cationic polyacrylamide, PVA, sodium polyacrylate, polyethylene imine, condensed naphthalenesulfonate, etc.

(e) Condensed phosphate salt, such as sodium hexametaphosphate, sodium tripolyphosphate, etc.

(f) Cationic starch derivatives, such as corn starch base, tapioca starch base, potato starch base, etc.

(g) Cellulose derivatives, such as carboxymethyl cellulose, carboxyethyl cellullose, hydroxypropyl cellulose, cationized cellulose derivative, etc.

(h) Microbial polymers, such as xanthane gum, polydextrose, etc.

(i) Plant gums and derivatives thereof, such as gum Arabic, alginic acid, etc.

(j) Animal high polymers, such as casein, chitosan, etc.

(k) Synthetic polymers, such as synthetic rubber latex, polyvinyl acetate emulsion, etc.

The polyester-grafted starch-polymer alloy, its mixture at molecular level with independent polyester and the thermoplastic resin compositions thereof of the present invention are useful in a broad range of the following application areas:

(a) Films and sheets formed by extrusion, casting, rolling, inflation, etc.

(b) Laminations and coatings on paper, sheet, film, non-woven fabric, etc.

(c) Additives to be incorporated into paper during paper-making processes to impart special functions to paper and paper products.

(d) Additives to be incorporated into non-woven fabric during manufacturing processes to impart special functions to non-woven fabrics and their products.

(e) Aqueous emulsions and aqueous dispersions.

(f) Solid or cellular moldings produced by injection molding, extrusion molding, blow molding, transfer molding, compression molding, etc.

The present invention provides a polyester-grafted starch-polymer alloy and a thermoplastic resin composition comprised at least in part of such alloy. As demonstrated in the following examples, the resin composition yields products such as moldings, having good impact resistance and flexibility for practical use in both dry and wet states even though it is incorporated with no or only a little plasticizer. Furthermore, the alloy and the resin composition thereof yield moldings which have the following characteristic properties:

(a) Elongation greater than 10% (within elastic limit).

(b) Improved water vapor transmission.

(c) Good flexibility (in the form of film) using with no or only a little plasticizer. (This is not true for the conventional starch-based resin or blend.)

(d) Greatly improved retention of plasticizer.

(e) Capability to accept a large amount (up to 50%) of mineral filler without adverse effect on moldability.

(f) Capability to yield injection molded items having a low flexural modulus and good flexibility.

In addition to the above-mentioned properties, the moldings are still biodegradable.

It is believed that the above-mentioned effects arise from increased molecular weight, adequate crystallinity, polarity distribution, internal plasticizing, etc. together with existing the acyl group (ester) introduced through the alcoholic hydroxyl groups of starch and also together with existing grafted polylactone (having entirely or partly blocked its terminal hydroxyl groups) and also together with existing independent polyester which has entirely or partly blocked its terminal hydroxyl groups and is mixed (or dispersed) at molecular level. Another reason is the fact that the alcoholic hydroxyl groups of starch are blocked and the terminal hydroxyl groups of the grafted polylactone are almost completely blocked.

The preferred process for the preparation of the polyester-grafted starch-polymer alloy produces the following unexpected effects:

(a) Polyester grafting and polymerization for the independent polymer (ring-opening polymerization) at low temperatures under reduced pressure. Especially, the simultaneous grafting and polymerization under reduced pressure protects starch from thermal decomposition which lowers the molecular weight of starch. The reaction in this manner permits the independent polymer to be uniformly dispersed at the molecular level and readily gives graft polymers (graft chains) having a high molecular weight.

(b) The process of the present invention employs a catalyst which is effective for both esterifying and grafting. This catalyst activates the alcoholic hydroxyl groups of starch as shown below, so that the lactone graft-polymerization and the esterification take place simultaneously in the same system.

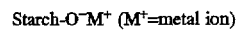

Starch-O⁻M⁺ (M⁺=metal ion)

This reaction ensures the grafting onto starch. In addition, the esterifying reaction suspends the ring-opening polymerization and, at the same time, blocks the terminal hydroxyl groups of the grafted polylactone and the independent polyester (polylactone). Consequently, the resulting product is hydrophobic despite its low degree of polymerization, and hence it can be readily handled and recovered under water. This means that it is possible to control, by using an inexpensive catalyst, the synthesis (production) of the polyester-grafted starch-polymer alloy in which the polymer moiety varies in the degree of polymerization.

The invention will be understood more readily by reference to the following Examples and Comparative Examples; however, these examples are intended to illustrate the invention and are not to be construed to limit the scope of the invention. In examples, "parts" means "parts by weight" unless otherwise indicated.

Preparation (synthesis) of polyester-grafted starch-polymer alloy or esterified starch

EXAMPLES 1 TO 3 AND COMPARATIVE EXAMPLES 1 AND 2

The above examples were conducted using the reaction conditions and the formulations listed below.

EXAMPLE 1

| High-amylose corn starch | 100 parts |
|---|---|
| ← Sodium bicarbonate | 20 parts |
| ← DMSO | 800 parts |

Heating and dissolution
(at 80° C. for 30 minutes)

Sodium-starch complex

| ← Addition of ε-caprolactone | 120 parts |
|---|---| with stirring at 80° C.
under reduced pressure (30 mmHg)

Reaction for 1 hour
(at 80° C. and 30 mmHg)

| ← Addition of sodium methylate | 0.6 parts |
|---|---|

Reaction for 2 hour
(at 80° C. and 30 mmHg)

| ← Addition of vinyl acetate after depressurizing | 160 parts |
|---|---|

Reaction for 2 hours
(at 80° C. and atmospheric pressure)

Recovery under water, followed by dehydration, washing, and drying.

EXAMPLE 2

| High-amylose corn starch | 100 parts |
|---|---|
| ← Sodium bicarbonate | 20 parts |
| ← DMSO | 800 parts |

Heating and dissolution
(at 80° C. for 30 minutes)

Sodium-starch complex

| ← Addition of L-lactide with stirring at 80° C. under reduced pressure (10 mmHg) | 200 parts |
|---|---|

Reaction for 1 hour
(at 80° C. and 10 mmHg)

| ← Addition of aluminum-ethylate | 0.6 parts |
|---|---|

Reaction for 2 hour
(at 80° C. and 10 mmHg)

| ← Addition of vinyl acetate after depressurizing | 160 parts |
|---|---|

Reaction for 2 hour
(at 80° C. and atmospheric pressure)

Recovery under water, followed by dehydration, washing, and drying.

EXAMPLE 3

| High-amylose corn starch | 100 parts |
|---|---|
| ← Sodium bicarbonate | 20 parts |
| ← DMSO | 800 parts |

Heating and dissolution
(at 80° C. for 30 minutes)

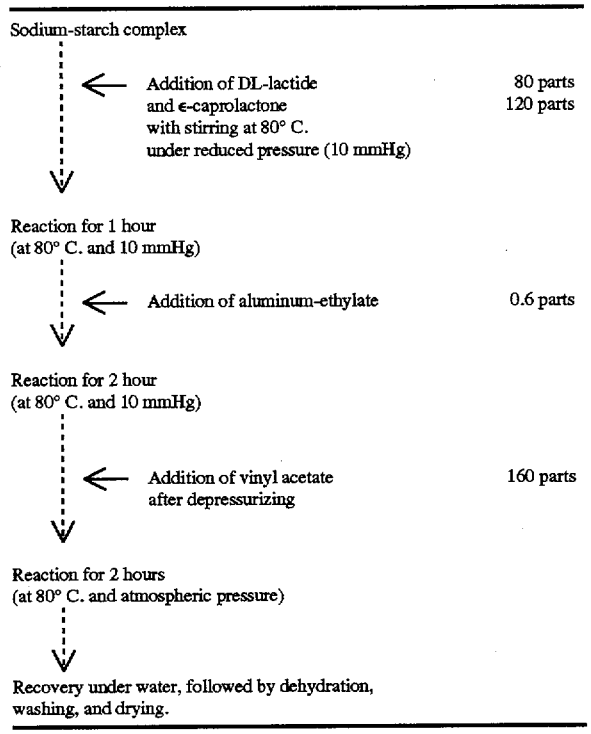

COMPARATIVE EXAMPLE 1

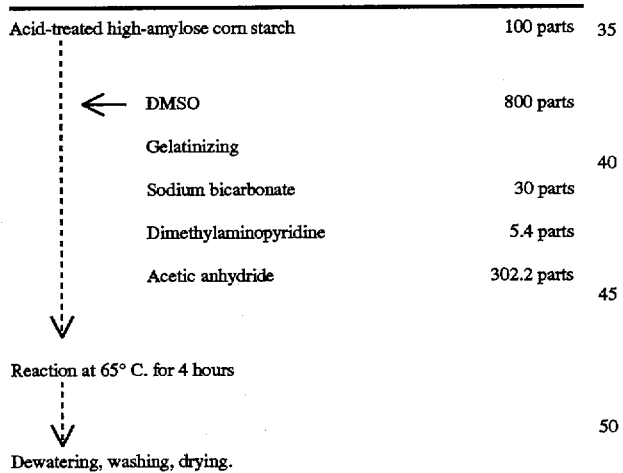

COMPARATIVE EXAMPLE 2

| corn starch | 100 parts |
| --- | --- |
| N,N-dimethylacetamide | 1299 parts |
| Anhydrous lithium chloride | 117.3 parts |

Stirring and dissolution at 165° C. for 30 minutes

| ε-caprolactone | 350.0 parts |
| --- | --- |
| Triethylamine | 61.5 parts |

Reaction at 85° C. for 18 hours

Cooling dissolution in methanol

Precipitation with cold water, washing, and recovery.

The products of Examples 1 to 3 and Comparative Examples 1 and 2 had the degree of molecular substitution by grafting, the ratio of terminal ester blocking, the content of independent polyester, and the degree of ester substitution, as shown in Table 1.

Incidentally, the degree of molecular substitution by grafting was calculated using the above-mentioned formula for MS. The amount of the polyester connected to starch was determined (by gas chromatography) after removal of the independent polyester by Soxhlet extraction with carbon tetrachloride for 24 hours and subsequent acid decomposition.

TABLE 1

|  | Example 1 | Example 2 | Example 3 | Comparative Example 1 | Comparative Example 2 |
| --- | --- | --- | --- | --- | --- |
| Formulation | Fig. 1 | Fig. 2 | Fig. 3 | Fig. 4 | Fig. 5 |
| Degree of molecular substitution for grafting | 0.85 | 2.1 | 1.9 | — | 1.40* |
| Ratio of terminal ester blocking | 40% | 70% | 70% | — | — |
| Content of independent polyester | 25% | 15% | 16% | — | — |
| Degree of ester substitution | — | — | — | 2.45 | — |

*The reaction product was a very soft rubbery substance containing a large amount was water. It presented difficulties in recovery and washing.

TEST EXAMPLE 1

Each product (100 parts) obtained in Example 1 and Comparative Examples 1 and 2 was incorporated with a plasticizer (triacetin) in an amount enough for the resulting composition exhibits the same level of tensile elastic modulus. The product obtained in Example 1 was not incorporated with plasticizer because it has a low elastic modulus which obviates the necessity of plasticizer. The product obtained in Example 1 is an alloy of grafted-starch and polycaprolactone which are uniformly mixed at the molecular level. The graft moiety is acetylated caprolactone formed by ring-opening polymerization.

The product obtained in Comparative Example 1 is an acetylated starch with a high degree of substitution. The product obtained in Comparative Example 2 is a grafted starch, with the graft moiety being a polymer formed by ring-opening polymerization of ∈-caprolactone.

Each resin composition was formed into dumbbell specimen (JIS No. 1), flexural specimen, disc specimen by injection molding after extrusion at 120° C. The specimens were tested for the following items according to the test methods indicated after the test item.

1) Tensile modulus, tensile strength, and elongation at break: JIS K-7113

2) Moisture absorption: The small specimen (Type JIS No. 1) was measured for weight after conditioning at 23° C. and 75% RH for 96 hours. The moisture absorption is expressed in terms of the ratio of the weight increase to the weight of the specimen measured before conditioning.

The results are shown in Table 2. It is noted that the sample in Example 1 does not need plasticizer at all, while the samples in Comparative Examples 1 and 2 need a considerable amount of plasticizer to attain a prescribed level of tensile modulus. In addition, the former is also superior in tensile strength, toughness, and water-relating properties such as moisture absorption.

TABLE 2

|  | Condition | Example 1 | Comparative Example 1 | Comparative Example 2 |
|---|---|---|---|---|
| Plasticizer (parts) |  | 0 | 45 | 25 |
| Tensile modulus | A | 3300 | 3000 | 3500 |
| Maximum tensile strength (kg/cm$^2$) | A | 63 | 50 | 45 |
| Elongation at break (%) | A | 90 | 30 | 17 |
| Moisture absorption (%) | B | 1.6 | 3.5 | 10.8 |

Condition A: measured immediately after conditioning at 23° C. and 50% RH for 72 hours.
Condition B: measured after storage at 23° C. and 75% RH for 96 hours.

TEST EXAMPLE 2

Each product (100 parts) obtained in Example 3 and Comparative Examples 1 and 2 was incorporated with a plasticizer (triacetin) in an amount specified in Table 3. The product obtained in Example 3 was not incorporated with plasticizer.

The product obtained in Example 3 is an alloy of grafted-starch and polymer which are uniformly mixed at the molecular level. The graft moiety is acetylated caprolactone-lactide, and the polymer moiety is polycaprolactone-polylactic acid.

Each resin composition was formed into 30-μm thick film by extrusion at 140° C. This film was laminated onto double-bleached kraft paper (with a basis weight of 125 g/m$^2$) by heat sealing. The resulting laminate paper was tested for the following items according to the test method specified.

1) Water vapor transmission . . . JIS Z0208

2) Water resistance . . . JIS P8140

3) Flexural strength . . . JIS P8114 (for evaluation of film toughness)

The test results are shown in Table 3. It is noted that the sample in Example 3 is by far superior to those in Comparative Examples 1 and 2 in water-relating properties (water vapor transmission and water resistance) and film toughness.

TABLE 3

|  | Example 3 | Example 1 | Comparative Example 2 | Comparative Example 2 |
|---|---|---|---|---|
| Plasticizer (parts) |  | 0 | 45 | 25 |
| Water vapor transmission (g/24 h-m$^2$) |  | 180 | 945 | 570 |
| Water resistance (g/m$^2$) |  | 4.7 | 4.8 | 12.5 |
| Folding endurans (cycles) |  | 1000< | 22 | 109 |

Condition: measured after conditioning at 23° C. and 50% RH for 72 hours.

TEST EXAMPLE 3

Resin compositions were prepared from the alloys obtained in Example 1 and Comparative Examples 1 and 2. Each sample (100 parts) was incorporated with a plasticizer (triacetin) and a filler (talk) in an amount shown in Table 4. The resulting resin composition was made into flexural test specimens (conforming to JIS K7203) by injection molding under the following conditions. The specimens were tested for flexural strength and flexural modulus. Molding condition: temperature . . . 165° C., injection pressure . . . primary (65%), secondary (35%), tertiary (30%), injection molding machine . . . PS-40 made by Nissei Jushi Kogyo Co., Ltd.

The test results are shown in Table 4. It is noted that the sample in Example 1 can accept more inorganic filler than the samples in Comparative Examples 1 and 2 and that the former has a lower flexural modulus and lower stiffness than the latter when the same amount of filler is incorporated.

TABLE 4

|  |  | Example 1 | Comparative Example 1 | Comparative Example 2 |
|---|---|---|---|---|
| Plasticizer (parts) |  | 0 | 10 | 10 |
| Flexural strength | Talc: 30 | 123 | 536 | 490 |
|  | Talc: 50 | 412 | not moldable | not moldable |
| Flexural modulus | Talc: 30 | 10177 | 62914 | 55200 |
|  | Talc: 50 | 52800 | — | — |

TEST EXAMPLE 4 (Biodegradability)

Resin compositions were prepared from the alloys obtained in Example 1 and Comparative Example 1. Each sample (1 g) was mixed with 20 g of shale soil. The mixture was given water so that the maximum water capacity was 60%. The sample was tested for biodegradability by measuring the amount of carbon dioxide gas evolved from the sample by decomposition at 25° C. The test results are shown in Table 5. It is noted that the sample in Example 1 is comparable in biodegradability to that in Comparative Example 1.

TABLE 5

| Amount of carbon dioxide gas evolved (ml) | Example 1 | Comparative Example 1 |
| --- | --- | --- |
| After 4 hours | 8.2 | 6.4 |
| After 12 hours | 18.0 | 15.8 |
| After 24 hours | 28.7 | 26.9 |

TEST EXAMPLE 5

The samples of alloys obtained in Example 1 and Comparative Example 1 were tested for glass transition point by using Shimadzu heat flux differential scanning calorimeter (DSC-50) under the following conditions. Sample: 8.600 mg, cell: aluminum, gas: nitrogen, flow rate: 50.00 mL/min, heating rate: 10° C./min, hold temperature: 220° C.

The test results are shown in Table 6. It is noted that the sample in Example 1 has a lower glass transition temperature than that in Comparative Example 1. This shows that the former can be molded without plasticizer.

TABLE 6

|  | Example 1 | | Comparative Example 1 |
| --- | --- | --- | --- |
| On-set | −20.05° C. | 22.48° C. | 177.86° C. |
| End-set | −17.87° C. | 31.15° C. | 184.31° C. |

On-set: temperature at which transition begins.
End-set: temperature at which transition is complete.

Both referred to as glass transition point region.

TEST EXAMPLE 6

The product obtained in Example 1 was made into a 50-μm thick film by extrusion at 160° C. Each product obtained in Comparative Examples 1 and 2 was incorporated with a plasticizer (triacetin) and ε-caprolactone ("TONE-787" from Union Carbide) in such an amount that the resulting mixture has the same composition as the product in Example 1. The components were mixed in the form of solids by using a plastomill. The resulting mixture was also made into a 50-μm thick film by extrusion at 160° C. The film samples were tested for clarity and elongation. (Clarity is expressed in terms of light transmission.)

The test results are shown in Table 7. It is noted that the sample in Example 1 is by far superior in light transmission and elongation to the samples in Comparative Examples 1 and 2. This result is due to the fact that the sample in Example 1 was produced by the competitive reaction of grafting and polymerization which greatly contributes to good compatibility (at the molecular level) of the grafted polyester moiety with the polymer moiety. It is understood that the composition of the present invention is a new one which is not obtained by mere mechanical blending and the novelty of the present invention resides in this manufacturing process.

TABLE 7

|  | Example 1 | Comparative Example 1 | Comparative Example 2 |
| --- | --- | --- | --- |
| Plasticizer (parts) | 0 | 50 | 30 |
| Amount of TONE-787 (%/resin) | 0 | 25 | 25 |
| Light transmission (%) | 72 | 45 | 61 |
| Elongation (%) | 450 | 170 | 210 |

We claim:

1. A polyester-grafted starch-polymer alloy comprising a blend of a polyester-grafted starch having the formula:

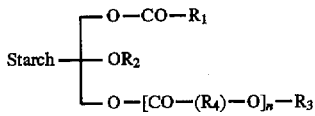

and, an independent polyester having the formula:

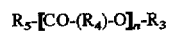

where, starch is the residue of starch molecule; $R_1$ is a member selected from the group consisting of alkyl groups, alkenyl groups, and aryl groups having 1 to 17 carbon atoms; $R_2$ is a member selected from the group consisting of hydrogen and an acyl group having 2 to 18 carbon atoms, $R_3$ is a member selected from the group consisting of hydrogen and an acyl group having 2 to 18 carbon atoms, but the $R_3$ in Formula I and the $R_3$ in Formula II are not both hydrogen, $R_4$ is a saturated hydrocarbon group represented by the formula:

$C_mH_{2m}$ in which m is 1 to 11;

$R_5$ is a member selected from the class consisting of an alkoxyl group having 1 to 10 carbon atoms, a polyalkoxyl group having 1 to 200 carbon atoms and an hydroxyl group and n is less than 1 to 4000.

2. A polyester-grafted starch-polymer alloy of claim 1, wherein the independent polyester accounts for 5 to 70 wt % therein.

3. A polyester-grafted starch-polymer alloy of claim 1, wherein 15 to 100% of the hydroxyl groups therein are blocked by esterification, the degree of molecular substitution by polyester grafting is 0.1 to 20, and the molecular weight of the polyester graft chain and the independent polyester is about 500 to about 200,000.

4. A polyester-grafted starch-polymer alloy of claim 2, wherein 15 to 100% of the hydroxyl groups therein are blocked by esterification, the degree of molecular substitution by polyester grafting is 0.1 to 20, and the molecular weight of the polyester graft chain and the independent polyester is about 500 to about 200,000.

* * * * *